(12) United States Patent
Byun et al.

(10) Patent No.: US 11,684,204 B2
(45) Date of Patent: Jun. 27, 2023

(54) LIQUID DISPENSING MACHINE WITH COMPACT DROP STOP

(71) Applicant: NESTEC S.A., Vevey (CH)

(72) Inventors: Da Mi Byun, Lausanne (CH); Bertrand Guyon, Saint Point Lac (FR); Marco Magatti, Lausanne (CH)

(73) Assignee: Societe des Produits Nestle S.A., Vevey (CH)

( * ) Notice: Subject to any disclaimer, the term of this patent is extended or adjusted under 35 U.S.C. 154(b) by 742 days.

(21) Appl. No.: 15/531,098

(22) PCT Filed: Nov. 26, 2015

(86) PCT No.: PCT/EP2015/077718
§ 371 (c)(1),
(2) Date: May 26, 2017

(87) PCT Pub. No.: WO2016/083488
PCT Pub. Date: Jun. 2, 2016

(65) Prior Publication Data
US 2017/0360247 A1    Dec. 21, 2017

(30) Foreign Application Priority Data
Nov. 27, 2014  (EP) .................................. 14195067

(51) Int. Cl.
*A47J 31/46*   (2006.01)
*A47J 31/36*   (2006.01)
*A47J 31/60*   (2006.01)

(52) U.S. Cl.
CPC ........... *A47J 31/46* (2013.01); *A47J 31/3623* (2013.01); *A47J 31/60* (2013.01)

(58) Field of Classification Search
CPC ........ A47J 31/46; A47J 31/3623; A47J 31/60; A47J 31/3676; A47J 31/4428; A47J 31/3633
(Continued)

(56) References Cited

U.S. PATENT DOCUMENTS 7,681,491 B2 *  3/2010  Agon .................... A47J 31/60
                                                    99/293
2002/0152895 A1 * 10/2002  Duffy ................. A47J 31/0642
                                                    99/279

(Continued)

FOREIGN PATENT DOCUMENTS

EP         2633789 A1 *  9/2013  .......... A47J 31/3633
JP         2014081889      5/2014
(Continued)

*Primary Examiner* — Dana Ross
*Assistant Examiner* — James F Sims, III
(74) *Attorney, Agent, or Firm* — K&L Gates LLP (57) ABSTRACT

A machine (1) for dispensing a dispensable liquid (5) has: a liquid delivery module (10) for delivering the dispensable liquid (5) from a source (50) and a service area (7) for collecting collectable liquid (5') from the liquid delivery module (10). The machine further includes a directing device (20) that has a dispensing position for directing said dispensable liquid (5) from the delivery module (10) to a dispensing area (6) and a collecting position for directing collectable liquid (5') from the delivery module (10) to the service area (7). The directing device (20) has only one evacuation portion (21) from which: —the dispensable liquid (5) is evacuated from the directing device (20) to the dispensing area (6) when the directing device (20) is in the dispensing position; and—the collectable liquid (5') is evacuated to the service area (7) when the directing device (20) is in the collecting position.

17 Claims, 3 Drawing Sheets

(58) Field of Classification Search
USPC .................. 99/293, 295, 300, 302 P, 302 R;
366/138; 222/108
See application file for complete search history.

(56) References Cited

U.S. PATENT DOCUMENTS

| | | | |
|---|---|---|---|
| 2003/0201337 A1 | 10/2003 | Carhuff et al. | |
| 2007/0209521 A1* | 9/2007 | Boussemarf | A47J 31/061 99/275 |
| 2007/0242561 A1* | 10/2007 | Agon | A47J 31/4482 366/279 |
| 2013/0247775 A1* | 9/2013 | Mori | A47J 31/407 99/295 |

FOREIGN PATENT DOCUMENTS

| | | | |
|---|---|---|---|
| WO | 2009130099 | 10/2009 | |
| WO | 2011144719 | 11/2011 | |
| WO | WO-2012025258 A1 * | 3/2012 | .......... A47J 31/3604 |
| WO | WO-2012025259 A1 * | 3/2012 | .......... A47J 31/3604 |
| WO | 2012072758 | 6/2012 | |

* cited by examiner

LIQUID DISPENSING MACHINE WITH COMPACT DROP STOP

CROSS REFERENCE TO RELATED APPLICATIONS

The present application is a National Stage of International Application No. PCT/EP2015/077718, filed on Nov. 26, 2015, which claims priority to European Patent Application No. 14195067.5, filed on Nov. 27, 2014, the entire contents of which are being incorporated herein by reference.

FIELD OF THE INVENTION

The field of the invention pertains to machines dispensing a liquid such as a beverage, for instance using capsules of an ingredient of the beverage to be prepared, to a user-recipient in a dispensing area and an arrangement for preventing undesired dripping of liquid residues into the dispensing area, in particular after a liquid dispensing process (after a serving) and/or between liquid dispensing processes (between servings).

For the purpose of the present description, a "beverage" is meant to include any human-consumable liquid substance, such as tea, coffee, hot or cold chocolate, milk, soup, baby food, etc. . . . . A "capsule" is meant to include any pre-portioned beverage ingredient, such as a flavouring ingredient, within an enclosing packaging of any material, in particular an airtight packaging, e.g. plastic, aluminium, recyclable and/or biodegradable packagings, and of any shape and structure, including soft pods or rigid cartridges containing the ingredient. The capsule may contain an amount of ingredient for preparing a single beverage serving or a plurality of beverage servings.

BACKGROUND ART

Certain beverage preparation machines use capsules containing ingredients to be extracted or to be dissolved; for other machines, the ingredients are stored and dosed automatically in the machine or else are added at the time of preparation of the drink.

Most beverage machines possess within a housing: filling means that include a pump for liquid, usually water, which pumps the liquid from a source of water that is cold or indeed heated through heating means, such as a heating resistor, a boiler, a thermoblock or the like, a brewing unit in which an ingredient is brewed with water or a mixing unit in which ingredients are mixed together, and a beverage outlet for dispensing the prepared beverage. Typically, the beverage outlet is located above a beverage dispensing zone, e.g. above a grid for supporting a cup or other recipient under the outlet and for the passage of drops of liquid from the beverage outlet or other spills into a collector tray located under the grid.

For example, EP 1 440 639 discloses a beverage machine comprising a receptacle stand having a hollow interior forming a drip tray. An upper surface of the receptacle stand is provided with a grill on which the receptacle is positioned. The drip tray is removable from the housing to ease emptying of the collected water. Drip tray devices with cup supports are well known in the art. There are also such devices that are further arranged for allowing the adjustment of the vertical position under the beverage outlet of cups of different sizes. Examples of arrangements in this field are disclosed in CA 2,260,352, EP 0 549 887, EP 1 731 065, EP 1 867 260, FR 2 439 042, U.S. Pat. Nos. 5,161,455, 5,353,692, WO 2009/074557.

WO 2012/072758 and WO 2013/127907 disclose beverage machines having a beverage guide located downstream an ingredient processing module that includes a first beverage path to a serving locating and a second beverage path to a service location. The module has a downstream part that is movable between an ingredient processing position and an ingredient insertion/evacuation position, the downstream part being coordinated with the beverage guide so that the beverage is directed to the service location when the downstream part in in the ingredient insertion/evacuation position and to the serving location when the downstream part is in the ingredient processing position. To reliably stop the dripping to the serving location at the end of the ingredient processing, the downstream part should be brought to the ingredient insertion/evacuation position at the end of beverage serving. Such an improved operation thus requires an automatic actuation of the downstream part controlled by the machine and thus a motorization or other automatic actuation of the downstream part is desirable or at least an advantage.

An alternative motorized beverage guide configuration is disclosed in EP2014186738.

WO 2006/050769 discloses a beverage preparation machine with a vertically movable cup support located under the machine's beverage outlet and a drop collector arm that is pivotable under the beverage outlet for collecting drops upon beverage dispensing. The drop collector is motorized and automatically moved away from the beverage outlet when a cup is detected under the outlet by a dedicated sensor and is moved back when the beverage processing is stopped. The electric motor of the collector is controlled by a controller connected to this cup sensor which controls also the beginning and a premature end of the beverage preparation and dispensing (due to an early removal of the cup). In an alternative embodiment, the drop collector is simply pushed out of the collecting position by a cup placed under the outlet and allowed back to the collecting position by the removal of the cup (mechanical cup sensor and drop stop actuation). In a further embodiment it is suggested to actuate the drop collector via the machine's pump hydraulically instead of electrically (coordination of the drop collector with the activity of the pump).

To avoid the use of a drop collector and corresponding actuation thereof between a collecting configuration and a dispensing configuration, it has been proposed in WO 2011/067264 to release the pressure upstream the beverage outlet and beverage preparation unit via a deviation valve so that evacuation of the residual pressurised liquid in the machine via the beverage outlet is minimised.

SUMMARY OF THE INVENTION

An object of the invention is to address at least some of the drawbacks of the prior art drop management systems or at least to provide an alternative thereto.

The invention relates to a machine for dispensing a dispensable liquid. Typically the dispensable liquid is a beverage.

The liquid dispensing machine can be an in-home or out of home machine. The machine may be a beverage machine, e.g. for the preparation of coffee, tea, chocolate, cacao, milk, soup, baby food, etc. . . . Such beverage machine may be arranged for preparing within a beverage preparation module a beverage by passing hot or cold water or another liquid through a capsule containing an ingredient, such as a flavoring ingredient, of the beverage to be prepared, such as ground coffee or tea or chocolate or cacao or milk powder.

Such beverage preparation typically includes the mixing of a plurality of beverage ingredients, e.g. water and milk powder, and/or the infusion of a beverage ingredient, such as an infusion of ground coffee or tea with water. One or more of such ingredients may be supplied in loose and/or agglomerate powder form and/or in liquid form, in particular in a concentrate form. A carrier or diluents liquid, e.g. water, may be mixed with such ingredient to form the beverage. Typically, a predetermined amount of beverage is formed and dispensed on user-request, which corresponds to a serving. The volume of such a serving may be in the range of 25 to 200 ml and even up to 300 or 400 ml, e.g. the volume for filling a cup, depending on the type of beverage. Formed and dispensed beverages may be selected from ristrettos, espressos, lungos, cappuccinos, latte macchiato, café latte, americano coffees, teas, etc. . . . . . In particular, a coffee machine may be configured for dispensing espressos, e.g. an adjustable volume of 20 to 60 ml per serving, and/or for dispensing lungos, e.g. a volume in the range of 70 to 150 ml per serving.

The machine may be configured to dispense simply plain water or another consumable or non-consumable liquid.

The machine may include a main or stationary frame and/or outside housing in which and/or to which the machine's components, e.g. the components mentioned below, are assembled. Exemplary beverage preparation architectures are for instance disclosed in WO 2009/074550 and WO 2009/130099.

The machine of the invention includes the following features:
- a liquid delivery module for delivering the dispensable liquid from a source, such as a liquid tank, the delivery module optionally comprising at least one of a liquid driver such as a pump, a liquid conditioner such as a heater and/or a cooler, and a mixing area such as an area delimited by a chamber e.g. a brewing and/or infusion chamber;
- a service area for collecting collectable liquid from the liquid delivery module, optionally the service area being associated with a removable collector such as a removable tank; and
- a directing device which has a dispensing position for directing the dispensable liquid from the delivery module to a dispensing area configured to receive a user-receptacle and a collecting position for directing collectable liquid from the delivery module to the service area.

The directing device can be located inside a machine frame and/or inside machine housing that is/are for instance provided, downstream the directing device, with:
- an outlet through which the dispensable liquid is delivered from inside to outside the machine frame and/or machine housing; and/or
- a guide surface along which the collectable liquid is guided to the service area.

For instance, the module is assembled to a machine's frame and/or outer or outside housing. For example, a fixed part of the module, e.g. a fixed first part or a fixed second part or a fixed module frame carrying the first and second parts, is assembled to such a machine's frame and/or housing.

Typically, the dispensing area is located below the directing device and/or below the machine's dispensing outlet (when present) downstream the directing device.

Normally, the dispensing area is located along one outside face of the machine, e.g. a front face, of the dispensing machine.

Suitable liquid drivers, such as a pumps, for driving liquid, e.g. water, along a liquid line from the liquid source via the processing module are disclosed in WO 2006/005425, WO 2009/024500, WO 2009/150030, WO 2010/108700 and WO 2011/107574.

The liquid may be driven to the directing device via a conditioner such as a heater and/or a cooler. A suitable heater may be a boiler, a thermoblock or an on demand heater (ODH), for instance an ODH disclosed in EP 1 253 844, EP 1 380 243 and EP 1 809 151. Other heaters are disclosed in WO 2009/043851, WO 2009/043865, WO 2009/092746 and WO 2011/157675 and WO 2012/007260.

The directing device may be assembled to a machine's frame and/or outer or outside housing. For instance, the device may be assembled to such a frame and/or housing, directly or indirectly, via a bearing system (e.g. a pivoting arrangement or a translational arrangement).

The dispensing area can be delimited by a receptacle support. Typically the support includes a support surface for positioning a user-recipient, e.g. a mug or a cup, to collect the dispensed beverage. The support surface may be formed by a support member that is part of the machine or may be a virtual surface, e.g. the surface of a table on which the machine is placed. Examples of such support surfaces for user-recipients are disclosed in EP 1 867 260, WO 2009/074557 and WO 2013/104636.

The service area may be delimited by a removable receptacle, e.g. located within a machine's frame and/or housing. The removable receptacle can be a waste collector, such as a waste material tank or reservoir. Examples of such collectors are disclosed in EP 1 867 260, WO 2009/074557, WO 2009/074559, WO 2009/135869, WO 2011/086087 and WO 2011/154492. Typically, the waste collector is configured for collecting at least one of: one or more waste beverage ingredients, such as a used flavouring ingredient and/or waste water; one or more used capsules for supplying a beverage ingredient into the machine; and a cleaning agent, such as a cleaning, rinsing or descaling liquid.

The liquid delivery module may include a control unit for controlling the dispensing of the liquid, e.g. the liquid driver and/or the thermal conditioner (when present). The machine can also comprise a user-interface (in addition to or comprising the user-interface member) for providing user-instructions to the control unit. Typically, the control unit is mounted to a machine's frame and/or housing and connected to (when present) the liquid driver, the thermal conditioner, and possibly other components such as sensor(s) (e.g. a temperature sensor or a flowmeter) and motor(s) via flexible or preferably rigid connections. Examples of control units and user-interfaces are disclosed in WO 2008/138710, WO 2009/043851, WO 2009/043865, WO 2009/092745, WO 2010/003932, WO 2010/037806, WO 2010/046442, WO 2011/020779, WO 2011/026853, WO 2011/054889, WO 2011/067156, WO 2011/067157, WO 2011/067181, WO 2011/067188, WO 2011/067191, WO 2011/067227, WO 2011/067232, WO 2011/144719, WO 2012/032019, WO 2012/072761, WO 2012/072764, WO 2012/072767 and WO 2012/093107.

For powering electric machine components, the machine may include an electric connector, such as an electric cord, for connection to the mains or other power source. Moreover, the machine may include an arrangement for storing the electric connector, such as a support for winding an electric cord.

In accordance with the invention, the directing device has only one evacuation portion, such as a single outlet opening, from which:
- the dispensable liquid is evacuated from the directing device to the dispensing area when the directing device is in the dispensing position, e.g. via the abovementioned outlet (when present); and
- the collectable liquid is evacuated to the service area when the directing device is in the collecting position, e.g. via the abovementioned guide surface (when present).

Hence, the directing device is simple and reliable.

The directing device can allow a flow of liquid from the outlet to an area for dispensing the liquid e.g. into a user-receptacle (e.g. a cup or a mug), or to a different area used for servicing the machine, e.g. a service area associated with a removable receptacle for collecting waste, such as residual liquid e.g. beverage, used ingredient and/or a cleaning fluid upon use.

The directing device can either divert the flow from an outlet of the delivery module to the service area and/or to the dispensing area. The directing device may also be arranged to not interfere with an upstream flow from an outlet of the delivery module either to the service area or to the dispensing area when the machine is configured so that liquid flowing from the module's outlet automatically reaches either the service area or dispensing area in the absence of any directing device.

The directing device can have only one reception portion, such as a single inlet opening, into or onto which the dispensable liquid and the collectable liquid are received from the liquid delivery module. For instance, the liquids are received from an outlet of the liquid delivery module.

The directing device may delimit only one liquid channel for directing both the dispensable liquid and the collectable liquid.

For instance, the channel is delimited by:
- a generally funnel-shaped body having an inlet opening and an outlet opening that is smaller than the inlet opening; and/or
- a generally cup-shaped body having an inlet opening formed by a cup rim and an outlet opening formed by a through-passage in a cup bottom.

The channel can be generally cylindrical, conical or prismatic or it can have another generally tapered shape, e.g. a part-cylindrical or ellipsoidal or sink-type shape.

The abovementioned outlet opening of the directing device in its dispensing position can lead directly into the dispensing area or, when present, it can lead to the dispensing area via the outlet of the machine frame and/or machine housing. For instance, the device's outlet opening may be provided above the frame and/or housing outlet with:
- a diameter that does not exceed or that is smaller than an opening diameter of the frame and/or housing outlet so that the frame and/or housing does not interfere with a flow of dispensable liquid from the device's outlet opening and through the frame and/or housing outlet; or
- at least a portion that is horizontally off-set relative to the frame and/or housing outlet so that at least a part of a flow of dispensable liquid from the device's outlet opening is drained along the frame and/or housing into the frame and/or housing outlet.

The directing device may be rigid and may be directly or indirectly movably mounted to a machine frame and/or a machine housing.

The directing device can be made of a single member or a plurality of non-articulated members that are fixed together.

The directing device can be pivotable and/or translatable between the collecting position and the dispensing position, such as pivotable about a pivoting axis, e.g. a pivoting axis that is generally horizontal or vertical.

The liquid delivery module may have an outlet upstream the directing device from which outlet liquid freely falls onto or into the directing device when the device is in either of the collecting and dispensing positions.

The machine can have a liquid guide, e.g. conduit, connected to and extending from the liquid deliver module to the directing device and connected thereto for guiding the liquid into the directing device. For instance, the liquid guide is articulated, such as flexible, to accommodate a displacement of the directing device between the dispensing and the collecting positions.

The machine can have an outside machine face, such as a front face, delimiting the dispensing area that is located below the directing device and/or (when present) below the machine's dispensing outlet downstream the directing device.

The machine may have an actuator which is configured for actuating and moving the directing device between the collecting and dispensing positions, such as from the collecting position into the dispensing position and/or from the dispensing into the collecting position. For instance, the actuator motorized and/or manual.

Suitable motorized actuators for actuating and moving the directing device are for example disclosed in WO 2006/050769, WO 2012/072758, WO 2013/127907 and EP2014186738.2.

The actuator may include a user-interface member.

The user-interface member can be located away from the dispensing area, the machine having an outside machine face, such as a front face, delimiting the dispensing area that is located below the directing device and/or when present below the machine's dispensing outlet downstream the directing device. For instance, the user-interface member is located on the same outside face above the dispensing area, e.g. perpendicularly above or off-set above the dispensing area, or on another outside face, such as an outside top face or an outside lateral face or an outside rear face.

The user-interface member may be arranged to be contacted and moved by a user to displace the member from a first member position to a second member position, the user-interface member being configured to exercise a force and/or a torque onto the directing device to move the directing device between the collecting position and the dispensing position when the user-interface member is moved between the first member position and the second member position. For instance, the user-interface member is connected to the directing device directly or via a force and/or torque transmitting transmission. The transmission can be at least one of mechanical (e.g. including gears, belts, levers, etc. . . . ), hydraulic (e.g. including hydraulic pistons and conduit arrangements, etc. . . . ), pneumatic (e.g. pneumatic pistons and conduit arrangements, etc. . . . ) and magnetic (e.g. including one or more permanent magnets cooperating together and/or with one or more ferromagnetic elements). Such transmission does not involve any electric motor or electric actuator.

The user-interface member and the directing device may be arranged closely together (e.g. via a direct mechanical connection or connected via a magnetic or mechanical transmission) or they may be arranged at a distance in the machine (e.g. via a mechanical, hydraulic or pneumatic transmission).

The user-interface member can be configured to exercise a force and/or a torque onto the directing device to move the directing device: from the collecting position to the dispensing position when the user-interface member is moved from the first member position into the second member position; and/or from the dispensing position to the collecting position when the user-interface member is moved from the second member position into the first member position.

The user-interface member may be movable pivotably and/or in translation between the first member position and the second member position, such as pivotable about a pivoting axis, e.g. a pivoting axis that is generally horizontal or vertical.

The user-interface member can be in a stable position in at least one of the first and second member positions. For instance, the member is in a stable position in either:
- the first member position or the second member position, the member being monostable; or
- the first member position and the second member position, the member being bistable; or
- at least one of the first and second member positions and another member position.

Such another member position may correspond to an on-off position of the machine (e.g. power switch) or to a service procedure of the machine (e.g. service switch). The same is applicable to said another position of the directing device. The directing device can have a collecting position for collecting waste liquid from the liquid delivery module or residual liquid that continues to drip after a dispensing procedure, i.e. after a serving of liquid, the directing device having optionally another position for directing larger amounts of liquid that are not intended for dispensing such as cleaning liquid circulated along the liquid delivery module during a cleaning process. The cleaning liquid may be directed to a location for collecting such cleaning liquid inside (e.g. to the machine's service area) or outside the machine.

The user-interface member can be a push-button, e.g. a translating and/or pivoting push-button, or a slider button or a toggle switch; or The actuator and the directing device can be mechanically connected by a transmission, such as a cam-transmission and/or a knuckle-joint transmission and/or a toothed or friction gear transmission and/or a belt transmission. For instance, the actuator has a drive rod or arm that engages mechanically via a mechanical connector, e.g. a pivot arrangement and/or cam arrangement, with a drive rod or arm of the directing device to transmit and convert a movement of the actuator into a corresponding movement of the directing device.

The machine may include at least one resilient element, such as a return spring, that is connected to at least one of the actuator and the directing device, the resilient element being configured to urge the directing device into the collecting position, the dispensing position or another position.

The machine can have a dampening arrangement, such as a friction arrangement and/or an inertia arrangement e.g. a friction and/or spur gear arrangement, for dampening a movement of the actuator and/or the directing device.

The liquid delivery module can have a switch for controlling a dispensing of the dispensable liquid, such as a switch for controlling a liquid driver and/or a liquid conditioner, the switch being actuated by at least one of the actuator and the directing device when the directing device reaches the dispensing position or the collecting position or another position.

The switch can be part of or controlled/monitored by a control unit and/or a user-interface that is distinct from the user-interface member and the directing device.

The switch can be connected to and/or integrated in a control unit of the machine or can be directly connected to a power component, e.g. a liquid driver and/or a thermal conditioner, to shut on or off the power component.

For instance, the directing device and/or the actuator have an actuating part configured to mechanically actuate the switch when the directing device reaches the dispensing position, the collecting position or another position.

The liquid delivery module can have an actuator such as a motor or user-handle, for instance a pivotable and/or translatable user-handle e.g. a user-handle pivotable about a generally horizontal axis, for operating the delivery module. For instance, such user-handle is movable into at least one position that extends over and above the user-interface member.

Hence, the liquid delivery module may incorporate an actuator when the module incorporates two relatively movable parts, e.g. two parts delimiting a chamber (e.g. as discussed below).

The liquid delivery module actuator may be semi-automatic, such as a module actuator comprising an energy buffer, e.g. a spring, that is loaded in one direction and unloaded in an opposite direction when the first and second parts are relatively driven between the transfer configuration and the processing configuration.

The module actuator can be fully automatic, such as a module actuator comprising an energy converter, for instance a converter into mechanical energy of electric and/or hydraulic energy such as an electric motor and/or a hydraulic actuator e.g. powered via the liquid driver. Optionally, the actuator is controlled by the control unit.

The module actuator can be manual, such as a module actuator comprising a handle, e.g. a pivotable and/or a translatable handle, that can be driven manually by a user (as mentioned above). In an embodiment, the actuator drives the first part and/or the second part via a transmission such as a transmission comprising a gear arrangement and/or a lever arrangement, e.g. a transmission that is assisted by an automatic return spring.

Examples of module actuators and their control and transmissions can be found in EP 1 767 129, WO 2005/004683, WO 2007/135135, WO2007/135136, WO 2011/042400, WO 2011/042401, WO 2012/025258, WO 2012/025259, WO 2012/093108, WO 2014/056810, WO 2014/056862, WO 2014/096121, EP2014163793 and EP2014163810 and the references cited therein.

The liquid delivery module may have a chamber delimiting the mixing area for flavouring the liquid with a flavouring ingredient in the chamber.

The chamber can be loaded and/or unloaded with flavouring ingredient by operating an actuator such as a motor or a user-handle.

The chamber may be delimited by an upstream part and a downstream part that are relatively movable between a position for mixing and a position for loading into the chamber and/or unloading from the chamber the flavouring ingredient. For instance, the downstream part:
a) incorporates a or said liquid delivery module outlet;
b) is fixed in a machine frame and/or housing and facing the upstream part that is movable in the machine frame and/or housing;

c) is movable in a machine frame and/or housing and facing the upstream part that is fixed or movable in the machine frame and/or housing; or
d) combines two or more of features a), b) and c).

The chamber may be associated with an ingredient transfer passage such as a passage including at least one of an insertion passage and a removal passage. For instance, the transfer passage is:
a) generally upright so that the flavouring ingredient can be driven along the transfer passage by gravity;
b) configured such as to guide the flavouring ingredient into the service area;
c) configured to match an outer shape of a capsule containing the flavouring ingredient to guide the capsule in a determined orientation along the transfer passage, optionally the removal passage having a pair of opposite longitudinal recesses configured to match a flange of the capsule;
d) covered by an upstream cover, such as a user-handle, when the chamber is in a configuration for mixing the flavouring ingredient with the liquid, and uncovered by the upstream cover when the chamber is in a configuration for loading and/or unloading the flavouring ingredient; or
e) a combination of two or more of features a), b), c) and d).

In an embodiment, the ingredient is supplied within a capsule to the module. Such a capsule may have a container covered by a lid e.g. a container and/or a lid extending radially to form a flange.

Examples of capsules are disclosed in EP 0 512 468 and EP 0 512 470.

Examples of modules with chambers are disclosed in WO 2007/135135, WO 2009/043630 and WO 2011/042400.

The module can be configured to process a capsule containing the beverage ingredient that is mixed with the liquid to be dispensed. The module, e.g. the above chamber, may comprise or may be associated with at least one capsule opener, such as at least one of: one or more puncturing and/or tearing elements; and one or more pins and/or blades, such as a capsule piercer or tearing plate, e.g. as known from EP 0 512 468, EP 0 512 470, EP 1 299 022, EP 1 339 305, WO 2013/026845, WO 2014/076041, PCT/EP14/067284, PCT/EP14/067286 and PCT/EP14/067287.

Typically, the module includes an inlet for letting the liquid, e.g. water, to the ingredient to be mixed therewith. The module inlet may be formed on a first module part and the module outlet may be formed on a second module part or vice versa. The module inlet and the module outlet can be formed on the same module part.

BRIEF DESCRIPTION OF THE DRAWINGS

The invention will now be described with reference to the schematic drawings, wherein.

DETAILED DESCRIPTION

The following description in connection with the appended figures concerns a non-limiting embodiment of a machine 1 for dispensing a liquid 5 according to the invention. For example, machine 1 can be arranged for preparing and dispensing tea and/or coffee or another beverage including liquid food such as soup.

Machine 1 has a liquid delivery module 10 for delivering dispensable liquid 5 from a source, such as a liquid tank 50. For instance, module 10 includes at least one of a liquid driver 15 such as a pump, a liquid conditioner 16 such as a heater and/or a cooler, and a mixing area 17 such as an area delimited by a chamber e.g. a brewing and/or infusion chamber.

Machine 1 comprises a service area 7 for collecting collectable liquid 5' from module 10. For instance, service area 7 is associated with a removable collector 70 such as a removable tank.

Figure 1:
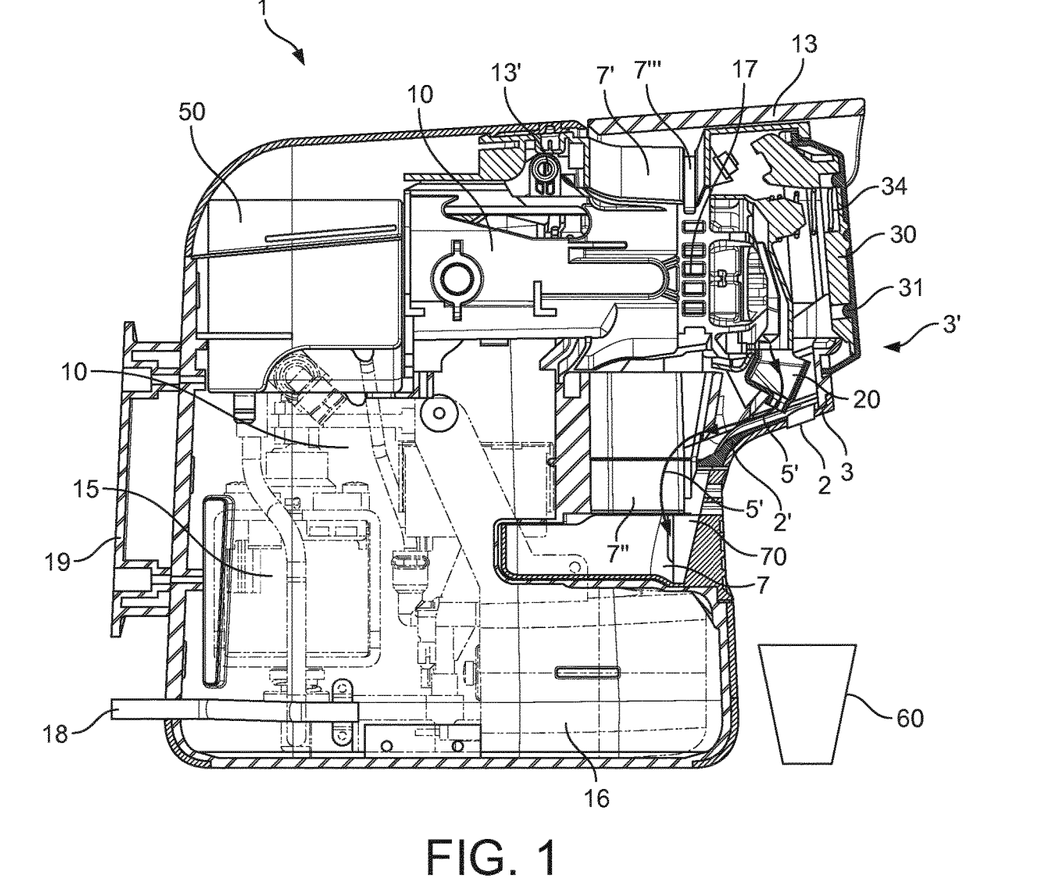
FIG. 1 is a cross-sectional view dispensing machine according to the invention with a directing device in a collecting position.
Figure 2:
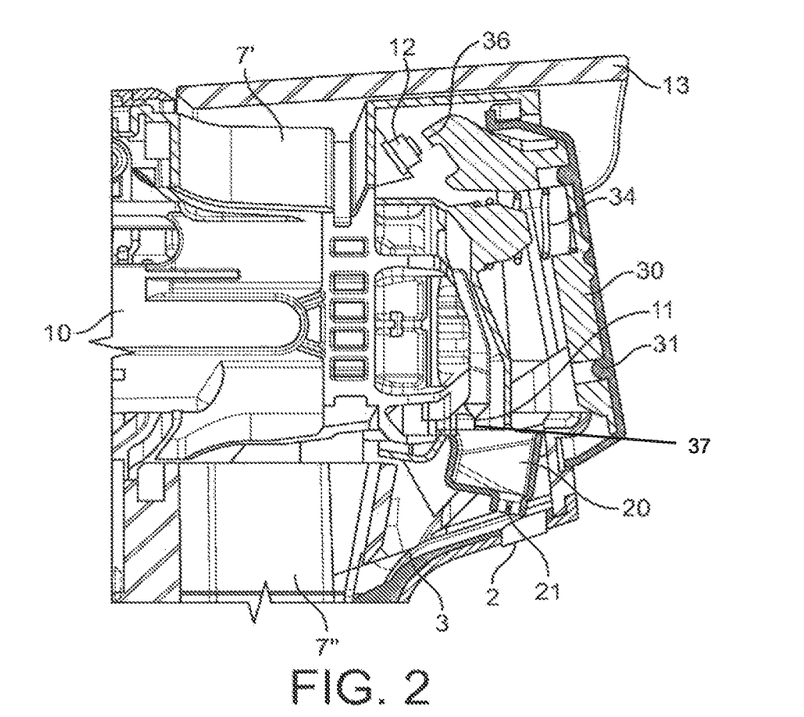
FIGS. 2 and 3 show part of the machine of FIG. 1 in which the directing device is, respectively, in an intermediate position and in a dispensing position.
Figure 3:
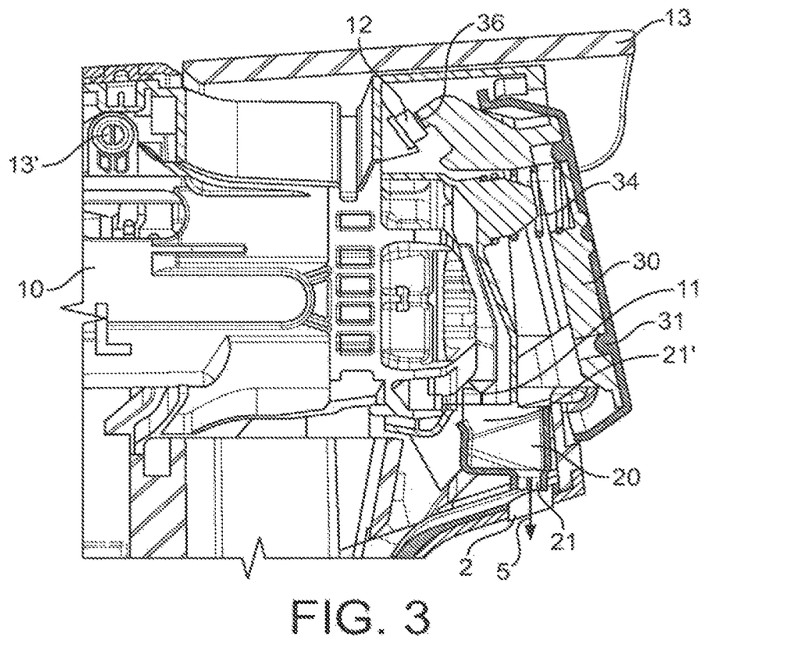
Figure 4:
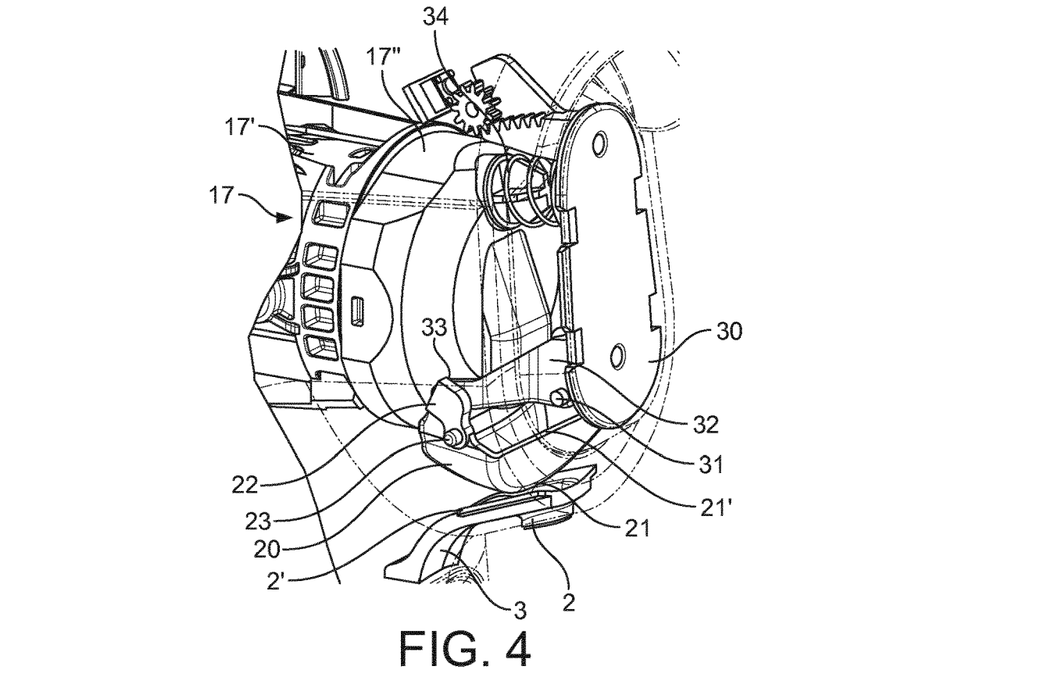
FIGS. 4 and 5 are perspective views of part of the machine illustrated in FIGS. 1 to 3 with the directing device in a collecting position and in a dispensing position, respectively.
Figure 5:
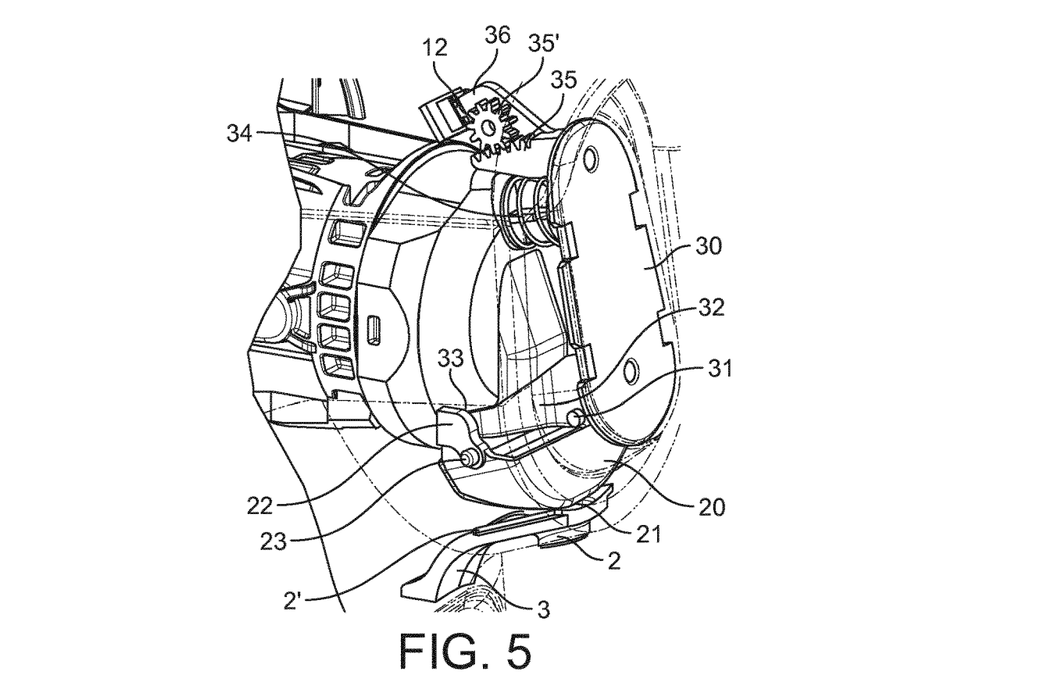

Machine 1 includes a directing device 20. Such device 20 has: a dispensing position (FIGS. 3 and 5) for directing dispensable liquid 5 from delivery module 10 to a dispensing area 6 configured to receive a user-receptacle 60; and a collecting position (FIGS. 1 and 4) for directing collectable liquid 5' from delivery module 10 to service area 7.

For instance, directing device 20 is located inside a machine frame and/or inside machine housing 3 which is for instance provided, downstream directing device 20, with an outlet 2 through which dispensable liquid 5 is delivered from inside to outside the machine frame and/or machine housing 3 and/or with a guide surface 2' along which collectable liquid 5' is guided to service area 7.

In accordance with the invention, directing device 20 has only one evacuation portion 21, such as a single outlet opening, from which:
dispensable liquid 5 is evacuated from directing device 20 to dispensing area 6 when directing device 20 is in the dispensing position; and
collectable liquid 5' is evacuated to service area 7 when the directing device 20 is in the collecting position.

Directing device 20 may have only one reception portion 21', such as a single inlet opening, into or onto which dispensable liquid 5 and collectable liquid 5' are received from liquid delivery module 10. For instance, liquids 5,5' are received from an outlet 11 of liquid delivery module 10.

Directing device 20 delimits only one liquid channel 21,21' for directing dispensable liquid 5 and collectable liquid 5'.

This channel may be delimited by a generally funnel-shaped body 21,21' having an inlet opening 21' and an outlet opening 21 that is smaller than the inlet opening 21'. The channel can be delimited by a generally cup-shaped body 21,21' having an inlet opening 21' formed by a cup rim and an outlet opening 21 formed by a through-passage in a cup bottom.

The channel may be generally cylindrical, conical or prismatic or have another generally tapered shape, e.g. a part-cylindrical or ellipsoidal or sink-type shape.

Outlet opening 21 of directing device 20 in its dispensing position may lead directly into the dispensing area or, when present, it may lead to dispensing area 6 via outlet 2 of machine frame and/or machine housing 3. For instance, outlet opening 21 of directing device 20 may be provided above frame and/or housing outlet 2, outlet opening 21 having:
a diameter that does not exceed or that is smaller than an opening diameter of frame and/or housing outlet 2 so that frame and/or housing 3 does not interfere with a flow of dispensable liquid 5 from the device's outlet opening 21 and through frame and/or housing outlet 2; or at least a portion that is horizontally off-set relative to the frame and/or housing outlet 2 so that at least a part of a flow of dispensable liquid 5 from the device's outlet opening 21 is drained along frame and/or housing 3 into frame and/or housing outlet 2.

Directing device 20 can be rigid and directly or indirectly movably mounted to a machine frame and/or a machine housing 3.

Directing device 20 may be made of a single member or a plurality of non-articulated members that are fixed together.

Directing device 20 can be pivotable and/or translatable between the collecting position and the dispensing position, such as pivotable about a pivoting axis 23, e.g. a pivoting axis 23 that is generally horizontal or vertical.

Liquid delivery module 10 may have an outlet 11 upstream directing device 20 from which outlet 11 liquid 5,5' freely falls onto or into directing device 20 when device 20 is in either of the collecting and dispensing positions.

Machine 1 can have a liquid guide 37, e.g. conduit, connected to and extending from the liquid deliver module to the directing device and connected thereto for guiding the liquid into the directing device. For instance, the liquid guide 37 is articulated, such as flexible, to accommodate a displacement of the directing device between the dispensing and the collecting positions.

Machine 1 can have an actuator 30 which is configured for actuating and moving directing device 20 between the collecting and dispensing positions. For instance actuator 30 is arranged to actuate and move directing device 20 from the collecting position into the dispensing position and/or from the dispensing into the collecting position. Actuator 30 can be motorized and/or manual.

For instance, actuator 30 includes a user-interface member 30.

User-interface member 30 can be located away from dispensing area 6.

Machine 1 can have an outside machine face 3', such as a front face, delimiting dispensing area 6 that is located below directing device 20 and/or, when present, below machine's dispensing outlet 2 downstream directing device 20.

User-interface member 30 can be located away from dispensing area 6.

For instance, user-interface member 30 is located on the same outside face 3' above dispensing area 6, e.g. perpendicularly above or off-set above dispensing area 6, or on another outside face, such as an outside top face or an outside lateral face or an outside rear face.

User-interface member 30 may be contacted and moved by a user to displace member 30 from a first member position to a second member position, user-interface member 30 being configured to exercise a force and/or a torque onto directing device 20 to move directing device between the collecting position and the dispensing position when user-interface member 30 is moved between the first member position and the second member position.

For instance, user-interface member 30 is connected to directing device 20 directly or via a force and/or torque transmitting transmission 22,32,33 that is at least one of mechanical, hydraulic, pneumatic and magnetic.

User-interface member 30 can be movable pivotably and/or in translation between the first member position and the second member position, such as pivotable about a pivoting axis 31, e.g. a pivoting axis 31 that is generally horizontal or vertical.

User-interface member 30 may be in a stable position in at least one of the first and second member positions. For instance, member 30 is in a stable position in either:
the first member position or the second member position, the member being monostable; or
the first member position and the second member position, the member being bistable; or
at least one of the first and second member positions and another member position.

User-interface member 30 may be a push-button, e.g. a translating and/or pivoting push-button, or a slider button or a toggle switch.

Actuator 30 and directing device 20 can be mechanically connected by a transmission 22,32,33, such as a cam-transmission and/or a knuckle-joint transmission and/or a toothed or friction gear transmission and/or a belt transmission. For instance, actuator 30 has a drive rod or arm 32 that engages mechanically via a mechanical connector 33, e.g. a pivot arrangement and/or cam arrangement, with a drive rod or arm 22 of directing device 20 to transmit and convert a movement of actuator 30 into a corresponding movement of directing device 20. As mentioned above, the same effect can be achieved by a hydraulic, pneumatic and/or magnetic (non-motorized) transmission.

Machine 1 can include at least one resilient element 34, such as a return spring, that is connected to at least one of actuator 30 and directing device 20, resilient element 34 being configured to urge directing device 20 into the collecting position (FIGS. 1 and 4), the dispensing position or another position.

Machine 1 can comprise a dampening arrangement 35,35', such as a friction arrangement and/or an inertia arrangement e.g. a friction and/or spur gear arrangement, for dampening a movement of actuator 30 and/or directing device 20.

Liquid delivery module 10 can have a switch 12 for controlling a dispensing of liquid 5, such as a switch for controlling a liquid driver 15 and/or a liquid conditioner 16, switch 12 being actuated by at least one of actuator 30 and directing device 20 when directing device 20 reaches the dispensing position or the collecting position or another position. For instance, directing device 20 and/or actuator 30 has an actuating part 36 configured to mechanically actuate switch 12 when directing device 20 reaches the dispensing position, the collecting position or another position.

Switch 12 can be connected to and/or integrated in a control unit (not illustrated) or can be directly connected to a power component, e.g. a liquid driver and/or a thermal conditioner.

Typically, machine 1, when electric, has an electric connection, e.g. an electric cord 18, for connection to the mains or another power source. Machine 1 may also be equipped with means for storing the electric connection, e.g. a support 19 for winding electric cord 18.

Liquid delivery module 10 has an actuator 13 such as a motor or a user-handle 13, for instance a pivotable and/or translatable user-handle 13 e.g. a user-handle pivotable about a generally horizontal axis 13', for operating delivery module 10. For instance, user-handle is movable into at least one position that extends over and above user-interface member 30.

Liquid delivery module 10 may include a chamber 17 delimiting mixing area for flavouring liquid 5 with a flavouring ingredient in chamber 17.

Chamber 17 can be loaded and/or unloaded with flavouring ingredient by operating an actuator 13 such as a user-handle 13 or a motor.

Chamber 17 may be delimited by an upstream part 17' and a downstream part 17" that are relatively movable between a position for mixing and a position for loading into chamber 17 and/or unloading from chamber 17 the flavouring ingredient. For instance, downstream part 17":
a) incorporates liquid delivery module outlet 11;
b) is fixed in a machine frame and/or housing 3 and faces upstream part 17' that is movable in machine frame and/or housing 3;
c) is movable in machine frame and/or housing 3 and facing upstream part 17' that is fixed or movable in the machine frame and/or housing 3; or
d) combines two or more of features a), b) and c).

Chamber 17 can be associated with an ingredient transfer passage 7',7" such as a passage 7',7" including an insertion passage 7' and/or a removal passage 7". For instance, transfer passage 7',7" is:
a) generally upright so that the flavouring ingredient can be driven along transfer passage 7',7" by gravity;
b) configured such as to guide the flavouring ingredient into service area 7;
c) configured to match an outer shape of a capsule containing the flavouring ingredient to guide the capsule in a determined orientation along transfer passage 7',7", optionally removal passage 7',7" having a pair of opposite longitudinal recesses 7''' configured to match a flange of the capsule;
d) covered by an upstream cover 13, such as a user-handle, when chamber 17 is in a configuration for mixing the flavouring ingredient with liquid 5, and uncovered by upstream cover 13 when chamber 17 is in a configuration for loading and/or unloading flavouring ingredient; or
e) a combination of two or more of features a), b), c) and d).

The invention claimed is:

1. A machine for dispensing a dispensable liquid, the machine comprising:
   a liquid delivery module for delivering the dispensable liquid from a source, the liquid delivery module comprises a mixing area delimited by a chamber, the chamber delimited by an upstream part and a downstream part that are relatively movable between a first position and a second position, the first position is configured for mixing, and the second position is configured for loading a flavoring ingredient into the chamber and/or unloading a flavoring ingredient from the chamber;
   a service area for collecting collectable liquid from the liquid delivery module; and
   a directing device which has a dispensing position configured for directing the dispensable liquid from the liquid delivery module to a dispensing area configured to receive a user-receptacle, and the directing device also has a collecting position configured for directing the collectable liquid from the liquid delivery module to the service area, the directing device is separate from the liquid delivery module, wherein the directing device defines only one liquid channel for directing both the dispensable liquid and the collectable liquid, wherein the directing device is located inside a housing of the machine, the housing comprises a housing outlet through which the dispensable liquid is delivered, and the housing outlet is located downstream the directing device;
   the liquid channel is delimited by a body of the directing device comprising a funnel having an inlet opening and an outlet opening that is smaller than the inlet opening; the directing device has only one evacuation portion from which:
   the dispensable liquid is evacuated from the directing device to the dispensing area when the directing device is in the dispensing position; and
   the collectable liquid is evacuated to the service area when the directing device is in the collecting position.

2. The machine of claim 1, wherein the directing device has only one reception portion.

3. The machine of claim 1, wherein the outlet opening of the directing device in the dispensing position leads directly into the dispensing area.

4. The machine of claim 1, wherein the directing device is:
   rigid and is directly or indirectly movably mounted to a main frame of the machine and/or the housing of the machine; and/or
   made of a single member or a plurality of non-articulated members that are fixed together.

5. The machine of claim 1, wherein the directing device is pivotable and/or translatable between the collecting position and the dispensing position.

6. The machine of claim 1, wherein the liquid delivery module has a module outlet upstream the directing device from which outlet liquid freely falls onto or into the directing device when the directing device is in either of the collecting position or the dispensing position.

7. The machine of claim 1, which has a liquid guide connected to and extending from the liquid delivery module to the directing device and connected to the directing device for guiding the dispensable liquid into the directing device.

8. The machine of claim 1, which has an actuator which is configured for actuating and moving the directing device between the collecting position and the dispensing position.

9. The machine of claim 8, wherein the actuator comprises a user-interface member, the user-interface member is configured to be:
   located away from the dispensing area;
   contacted and moved by a user to displace the user-interface member from a first member position to a second member position, the user-interface member being configured to exercise a force and/or a torque onto the directing device to move the directing device between the collecting position and the dispensing position when the user-interface member is moved between the first member position and the second member position;
   movable pivotably and/or in translation between the first member position and the second member position, such as pivotable about a pivoting axis; and
   in a stable position in at least one of the first member position or the second member position.

10. The machine of claim 8, wherein the actuator and the directing device are mechanically connected by a transmission.

11. The machine of claim 8, which comprises:
    at least one resilient element that is connected to at least one of the actuator or the directing device, the at least one resilient element being configured to urge the directing device into the collecting position, the dispensing position or another position; and/or
    a dampening arrangement.

12. The machine of claim 8, wherein the liquid delivery module has a switch configured for controlling a dispensing of the dispensable liquid, the switch being actuated by at least one of the actuator or the directing device when the directing device reaches the dispensing position, the collecting position or another position.

13. The machine of claim 1, wherein the liquid delivery module has an actuator.

14. The machine of claim 1, wherein the outlet opening of the directing device in the dispensing position leads directly into the dispensing area via the housing outlet of the housing of the machine.

15. The machine of claim 1, wherein the liquid delivery module comprises a liquid driver comprising a pump, the liquid delivery module further comprises a liquid conditioner comprising at least one of a heater or a cooler, and the service area is associated with a removable collector.

16. The machine of claim 7, wherein the liquid guide is a flexible conduit.

17. The machine of claim 9, wherein the actuator is movable into at least one position that extends over and above the user-interface member.

* * * * *

UNITED STATES PATENT AND TRADEMARK OFFICE
CERTIFICATE OF CORRECTION

PATENT NO. : 11,684,204 B2  
APPLICATION NO. : 15/531098  
DATED : June 27, 2023  
INVENTOR(S) : Da Mi Byun et al.

Page 1 of 1

It is certified that error appears in the above-identified patent and that said Letters Patent is hereby corrected as shown below:

On the Title Page

Item (71) Please change the applicant name from "NESTEC S.A." to "SOCIÉTÉ DES PRODUITS NESTLÉ S.A."

Signed and Sealed this  
Sixth Day of August, 2024

Katherine Kelly Vidal  
*Director of the United States Patent and Trademark Office*